Sept. 18, 1934.  L. M. FREEMAN ET AL  1,974,211
METHOD OF MAKING HOSE
Filed Feb. 25, 1933
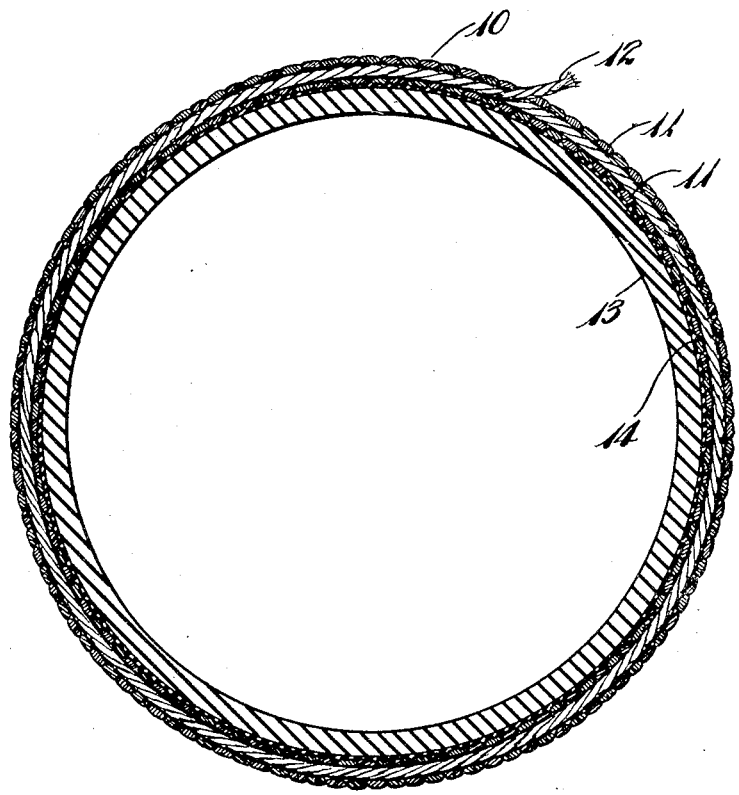
Inventors
Leonard M. Freeman
Harold W. Catt
By Eshun & Avery
Attys.

Patented Sept. 18, 1934

1,974,211

UNITED STATES PATENT OFFICE 1,974,211

METHOD OF MAKING HOSE

Leonard M. Freeman and Harold W. Catt, Akron, Ohio, assignors to The B. F. Goodrich Company, New York, N. Y., a corporation of New York Application February 25, 1933, Serial No. 658,540

5 Claims. (Cl. 154—8)

This invention relates to flexible hose and to methods of making the same and is especially useful in the manufacture of hose having a fibrous jacket.

Hose having an outer jacket of cotton or other fibrous material and an inner impervious flexible lining of rubber has been generally adopted as standard construction for fire hose for a great many years, principally because of the type of service which is intermittent and its superior flexibility and lighter weight. Where such hose is carefully dried and stored when not in use it exhibits remarkably long life.

The jacket of such hose, if not carefully dried, is subject to deterioration from mildew and rotting. It has been proposed to impregnate the fibrous jacket, which is usually woven in tubular form from cotton yarns, with oils, waxes, or greases or a mixture thereof to increase its resistance to mildew and rotting, to increase its flexibility, to prevent its freezing to wet pavements, to increase wear resistance of the jacket, and to increase the flexibility of the hose when cold. Such impregnation of the hose jacket has been found however to be difficult to accomplish due to the fact that where the wax and oil is forced entirely through the jacket into contact with the rubber, the contact of the oils and waxes wih the rubber lining is injurious to the lining and interferes with the securing of strong adhesion of the jacket to the lining. Where impregnation is not carried entirely through the jacket, better adhesion is obtained but the jacket is not thoroughly protected from moisture.

The principal objects of the present invention are to secure better adhesion between the jacket and lining with complete impregnation of the jacket and without materially increasing the rigidity of the article.

Other objects will appear from the following description and the accompanying drawing.

The single figure in the drawing shows a cross sectional view of a hose embodying the invention.

Referring to the drawing, the numeral 10 designates the fibrous jacket of the hose which is woven with longitudinal warp yarns 11 and helically laid circumferential filler threads 12 preferably of cotton material. The numeral 13 designates the rubber lining which is vulcanized to the jacket and the intervening protective deposit is indicated by the numeral 14.

In making hose according to this invention a cotton or other fibrous jacket is first woven or otherwise prepared and is then impregnated or coated on its inner surface with a thermo-plastic material capable of being partly absorbed by the fibrous jacket when subjected to heat and insoluble in waxes and oils. For this purpose we find artificial resinous condensation products such as the formaldehyde condensation product known as "Bakelite" very desirable, although other materials such as zinc stearate may be used, the properties of such a material essential to the process being ability to be applied over the inner surface of the jacket as a light coating, ability of being forced into the inner jacket to fill the same, ability to prevent migration of the waxes and oils, and ability to unite with rubber during the vulcanization of the lining.

The coating material conveniently may be applied as a dust deposited from an air stream passed through the jacket and powdered "Bakelite" is admirably adapted to the purpose. In fact, in addition to answering all the requirements of a satisfactory material as enumerated above, it is found that this dust develops a charge of static electricity when blown into the jacket and is thereby attracted to and retained by the inner surface of the jacket.

After the coating of dust has been applied the ends of the hose are attached to steam pipe connections and steam under pressure is admitted to the interior of the jacket for a short time. The heat partially sets the "Bakelite" and causes it somewhat to be absorbed by the jacket.

The jacket is next thoroughly dried and is ready to be impregnated with the wax mixture. This is applied in liquid form, the wax being melted and the jacket passed therethrough, the ends of the jacket being closed to prevent entrance of the wax to the interior of the jacket. The excess wax is removed by passing the jacket through squeeze rolls.

The rubber lining, which has been prepared as an unvulcanized tube is now pulled into the jacket, and steam connections are attached to the ends of the hose. Steam under pressure is now admitted to force the lining into contact with the jacket and vulcanize the lining. The adhesion of the rubber to the "Bakelite" or other coating is also accomplished during the vulcanizing step and the Bakelite is further set as the temperature used during vulcanization of the lining is higher than that used during steaming of the jacket and preliminary setting of the coating.

The coating of "Bakelite" or other material is impervious to oils and waxes and acts as a layer to prevent migration of wax to the lining while permitting the wax to be absorbed by all parts of the fibrous jacket not filled by the "Bakelite" coating.

In making a double jacket hose the two jackets are woven separately and one drawn over the other before the coating of dust is applied to the inner jacket.

I claim:

1. The method of making a hose having a rubber lining and a fibrous jacket which comprises impregnating the inner surface of the jacket with a thermo-plastic material, impregnating the remainder of the jacket with wax, inserting an unvulcanized rubber liner tube therein and vulcanizing the liner by heat and pressure applied from within the hose.

2. The method of making a hose having a rubber lining and a fibrous jacket which comprises dusting the inner surface of the jacket with a thermo-plastic material, heating the jacket to cause the thermo-plastic to impregnate its inner surface, impregnating the remainder of the jacket with wax, inserting an unvulcanized rubber liner tube in the jacket, and vulcanizing the liner by heat and pressure applied from within the hose.

3. The method of making a hose having a rubber lining and a fibrous jacket which comprises dusting the inner surface of the jacket with a synthetic resin capable of being softened by heat and insoluble in waxes when hardened, heating the jacket to impregnate the inner portion of the jacket, impregnating the remaining portion of the jacket with wax, inserting an unvulcanized rubber liner tube in the jacket, and vulcanizing the liner tube by heat and pressure applied from within the hose.

4. The method of making a hose having a rubber lining and a fibrous jacket which comprises forming a wax-resistant protective deposit of thermo-plastic material on the inner wall of the jacket, impregnating the jacket from without with wax, inserting an unvulcanized rubber liner tube in the jacket, and vulcanizing the liner tube by heat and pressure applied from within.

5. The method of making a hose having a rubber lining and a fibrous jacket which comprises forming a protective deposit of material, insoluble in wax and oil and capable of uniting with rubber when heated, on the inner surface of the jacket, impregnating the remainder of the jacket with wax, inserting an unvulcanized liner tube in the jacket, and vulcanizing the liner tube to the jacket.

LEONARD M. FREEMAN.
HAROLD W. CATT.